(12) United States Patent
Brusq et al.

(10) Patent No.: US 11,319,830 B2
(45) Date of Patent: May 3, 2022

(54) CONTROL OF CLEARANCE BETWEEN AIRCRAFT ROTOR BLADES AND A CASING

(71) Applicant: Safran Aircraft Engines, Paris (FR)

(72) Inventors: Tangi Brusq, Moissy-Cramayel (FR); Florence Valérie Bon, Moissy-Cramayel (FR); Damien Bonneau, Moissy-Cramayel (FR); Antoine Van Noort, Moissy-Cramayel (FR); Guilhem Camille François Verron, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 62 days.

(21) Appl. No.: 16/875,376

(22) Filed: May 15, 2020

(65) Prior Publication Data

US 2020/0362719 A1    Nov. 19, 2020

(30) Foreign Application Priority Data

May 16, 2019    (FR) ...................... 1905166

(51) Int. Cl.
| | |
|---|---|
| *F01D 11/24* | (2006.01) |
| *F02C 7/08* | (2006.01) |
| *F02C 3/06* | (2006.01) |
| *F02C 7/057* | (2006.01) |
| *F02C 9/18* | (2006.01) |

(52) U.S. Cl.
CPC .............. *F01D 11/24* (2013.01); *F02C 3/062* (2013.01); *F02C 7/057* (2013.01); *F02C 7/08* (2013.01); *F02C 9/18* (2013.01); *F05D 2220/323* (2013.01); *F05D 2260/232* (2013.01)

(58) Field of Classification Search
CPC .......... F01D 11/24; F02C 3/062; F02C 7/057; F02C 7/08; F02C 9/18; F05D 2220/323; F05D 2260/232
USPC ............................................................ 415/1
See application file for complete search history.

(56) References Cited

U.S. PATENT DOCUMENTS

| | | | | |
|---|---|---|---|---|
| 4,482,293 A * | 11/1984 | Perry | ......................... | F02C 7/20 |
| | | | | 415/113 |
| 5,605,437 A * | 2/1997 | Meylan | ................... | F01D 11/24 |
| | | | | 415/1 |
| 10,041,477 B2 * | 8/2018 | Bahuguni | ............... | F03D 80/40 |
| 11,111,809 B2 * | 9/2021 | Terwilliger | ............. | F01D 25/10 |
| 2001/0013582 A1 * | 8/2001 | Johnson | .................. | F01D 21/04 |
| | | | | 250/559.29 |
| 2005/0042080 A1 * | 2/2005 | Gendraud | ............... | F01D 11/24 |
| | | | | 415/173.1 |
| 2006/0018752 A1 * | 1/2006 | LeMieux | ................ | F03D 80/40 |
| | | | | 416/96 R |

(Continued)

FOREIGN PATENT DOCUMENTS

| | | |
|---|---|---|
| DE | 11 2016 005 433 T5 | 8/2018 |
| EP | 0 638 727 A1 | 2/1995 |

(Continued)

*Primary Examiner* — J. Todd Newton
(74) *Attorney, Agent, or Firm* — Blank Rome LLP

(57) ABSTRACT

A device for controlling clearance between the tips of rotating blades of an aircraft turbomachine and a casing. An air circulation path allows air to be blown onto the casing in order to change its temperature. In addition, heating means heat the circulating air.

9 Claims, 3 Drawing Sheets

(56) References Cited

U.S. PATENT DOCUMENTS

| | | | | |
|---|---|---|---|---|
| 2007/0264120 | A1* | 11/2007 | Amiot | F01D 11/24 |
| | | | | 415/173.2 |
| 2012/0297784 | A1* | 11/2012 | Melton | F23R 3/48 |
| | | | | 60/772 |
| 2013/0251500 | A1* | 9/2013 | Cheung | F01D 11/24 |
| | | | | 415/1 |
| 2015/0369076 | A1* | 12/2015 | McCaffrey | F01D 5/02 |
| | | | | 415/173.1 |
| 2018/0340468 | A1* | 11/2018 | Takamura | F01D 25/14 |
| 2019/0345835 | A1* | 11/2019 | Terwilliger | F01D 11/18 |
| 2019/0345836 | A1* | 11/2019 | Terwilliger | F01D 11/24 |
| 2020/0032708 | A1* | 1/2020 | Roberge | F01D 15/10 |

FOREIGN PATENT DOCUMENTS

| | | |
|---|---|---|
| EP | 2 527 601 A2 | 11/2012 |
| FR | 2 858 652 A1 | 2/2005 |
| FR | 2 867 806 A1 | 9/2005 |

* cited by examiner ns and contractions can be controlled via a valve, depending on the operating regime of the turbomachine, its temperatures/pressures or the aircraft's phase of flight.

CONTROL OF CLEARANCE BETWEEN AIRCRAFT ROTOR BLADES AND A CASING

CROSS REFERENCE TO RELATED APPLICATION

This application claims the priority of French application No. 1905166, filed May 16, 2019, the subject matter being incorporated in its entirety by reference herein.

TECHNICAL FIELD

Embodiments of the present invention relates to the general field of clearance control between the tip of rotating blades of an aircraft gas turbomachine rotor and an annular casing of a stator of the turbomachine.

Such a clearance control is particularly useful in the turbine to increase the efficiency of the turbomachine.

BACKGROUND

As embodiments of the present invention do, FR2858652 or FR2867806 refers to a clearance control device for controlling clearance between tips of blades of a rotor of an aircraft turbomachine and an annular casing of a stator of the aircraft turbomachine, said clearance control device comprising a flow path for a flow of air between:
- an air intake adapted to enable air to be taken from a first zone of the aircraft turbomachine,
- an air blower adapted to enable air to be blown to said annular casing, at the location of a second zone of the aircraft turbomachine, in order to modify a temperature of said annular casing.

An aircraft turbomachine typically extends about a longitudinal axis and generally comprises a turbine and a compressor each having a plurality of "fixed" blades (viz. blades of the stator of the turbomachine) arranged along the longitudinal axis alternately with a plurality of "moving" blades (viz. blades of the rotor of the turbomachine). The moving blades are surrounded over the entire circumference of the turbine or compressor by a stator part, referred to above as the annular casing, which defines, along the longitudinal axis of the turbomachine, an annular portion of the flow path of the gases through this turbomachine.

In the turbine, the blades receive energy from hot gases from the combustion chamber of the turbomachine to drive the turbomachine blower. In order to recover this energy, it is necessary to minimise the clearances between the blades and the annular casing.

In order to reduce this clearance, means have been developed to vary the diameter of the annular casing, which can take the form of annular ducts surrounding the annular casing and through which air from other parts of the turbomachine flows. This air is injected onto the outer surface of the annular casing which is opposite to the gas flow path and thus causes thermal expansions or contractions of the annular casing which change its diameter. These thermal expansions and contractions can be controlled via a valve, depending on the operating regime of the turbomachine, its temperatures/pressures or the aircraft's phase of flight.

The ability to modulate the clearance concerned here is limited by the technology used (intake air impact) and by the flow that can be taken, which can penalise the performance of the turbomachine. As a result, the clearance selected at the cold blade tip is typically a compromise between the ability to absorb clearance closures that can lead to wear (acceleration, hot starts of the turbomachine, etc.) and the ability to achieve the closest possible clearance when cruising, by modulating the available closure clearance. In some phases of flight, when the clearance becomes locally zero and there is contact between the casing and the moving blades, the average clearance increases and the ability to modulate the clearance in cruise to achieve the same performance clearance can become critical. Eventually, once this full capacity of the clearance closure is used, additional wear will immediately result in a drop in performance due to the opening of the blade tip clearance.

To date, air impact may prove to have too long a response time to effectively open the clearances during operation to limit performance-damaging wear and tear. Therefore, there is a need to provide a clearance control device that can deliver a faster temperature setpoint to limit the response time.

SUMMARY

In order to seek a solution to at least some of the above-mentioned problems, it is proposed that said clearance control device further comprises air heating means adapted to interfere with air circulating in said air flow path to enable it to be heated, the air heating means comprising electrical resistors electrically connected in parallel.

Thus, wear should be limited, in particular through the possibility of heating the casing strongly and quickly to expand it during the phases when there may be contact between the moving blades and the casing: accelerations, re-accelerations, hot starts, thrust reversal, etc.

This will improve the performance, reliability and accuracy of the controls/adjustments. Indeed, a solution using electrical resistors allows a fine adjustment of the heating possible, in particular through modulation of the electrical current and/or activation of resistor networks connected in parallel.

If, as will typically be the case, the (each) air intake is located in a (so-called first) zone of the turbomachine that is colder (less hot) than the (so-called second) air blowing zone, it will be possible:
- to cool the annular casing by not heating the air taken in, and thus to close the clearance, or
- to heat this casing by increasing the air temperature; therefore opening the clearance. For efficiency, reliability and fine-tuning, it is also proposed that the air heating means should comprise several air heating elements (i.e. multi-element means) arranged in the air flow so that the air can meet them successively or simultaneously.

In order to take into account a trade-off between cost/thermal efficiency/available energy/efficiency/fitting/reliability, it is furthermore proposed preferably that these means of heating air be, in the path of the air flow, interposed in the air flow and thus be in contact with said air.

In order to promote efficiency, reliability, fine-tuning of controls/adjustments and thermal efficiency, it is also proposed that provision be made for the control system to also include:
- a sensor adapted to sense physical parameter(s) in the turbomachine and/or in its environment, and
- control means connected with the air heating means in order to control said heating as a function of the physical parameter(s) sensed by the sensor.

In particular, said sensor(s) can be used to monitor the speed (rotation) of the turbomachine, temperatures, pressure and/or altitude.

An advantage of the proposed solution could also lie in the ability to choose whether the temperature of the air taken in is to be modulated or not and/or whether the pressure losses related to these air heating means are considered acceptable or not.

In connection with this point, it is proposed that the flow path of the air flow may include:
- a first circuit on which said electric resistors would be adapted to interfere with (viz. act on) the air flowing through it to enable air to be heated, and
- a bypass circuit which would bypass the electric resistors.

Bypassing the air heating means (i.e. bypassing the first circuit) could make it possible to gain in reactivity to the passage between hot and cold or to "pre-heat" these air heating means for future use, before circulating the air to be heated.

Another advantage of the proposed solution could also lie in the ability to pilot at the same time:
- the heating level of the air taken in (modulation of the heating of this air by said air heating means), and
- the air flow rate, via at least one valve which would preferably not be "all or nothing", but with a variable flow rate.

Consequently, the following is proposed:
said clearance control device further comprises a regulating valve interposed in the flow path of an air flow to allow more or less air to circulate in the air flow path, or
the aforementioned control means are further connected with said regulating valve, to control the air flow to the air blower according to the physical parameters sensed by the sensor(s). Concerning the aircraft turbomachine itself, including the clearance control device presented above with all or part of its characteristics, it is proposed:
that the clearance control device further comprises a control box mounted on said annular, and which can be designed to surround said annular casing, and
that the air heating means are:
either arranged upstream of the control box (upstream and downstream being defined in relation to the direction of flow of the air flow from the air intake to the air outlet), or
arranged in the control box.

Note that the closer the air heating means are to the casing to be heated, the faster the response time will be because there will be less "pipe length" to be heated before reaching the casing control box.

However, the choice of air heating means to act on the extracted air allows to place them where it is most convenient.

On this subject, it is also proposed more specifically:
that the gas turbomachine further comprises:
  a compressor unit wherein said air intake and said first zone of the turbomachine are located,
  a turbine unit comprising said annular casing and said rotor blades which drive in rotation other rotor blades of the compressor unit, by means of a shaft,
that in the gas turbomachine the control box comprises successively, on the flow path of the air flow:
  at least one air supply tube for supplying air to air collecting tubes, the at least one air supply tube being in fluid communication with said air intake,
  said air collecting tubes which have a ring shape or a portion of ring shape, for supplying air to air ducts opening into at least one annular air flow ramp arranged circumferentially around the annular casing, said at least one annular air flow ramp having orifices defining said airflow at the location of said second zone of the aircraft turbomachine,
  said air ducts,
  said at least one annular air circulation ramp, and
that the air heating means are arranged upstream of said at least one air supply tube or into said at least one air supply tube.

In another aspect, it is also proposed that the turbomachine in question should comprise several stages of a compressor of the turbomachine, and that said first air intake zone in the turbomachine should be located at only one of said several stages.

Thus, if there were a solution to take air from two different compressor stages and mix the two samples via a three-way valve, one advantage of the proposed solution would be the simplification of the solution by taking the air from only one stage and adjusting its temperature via the air heating means, preferably arranged in a network. This would save cost, weight and space, and the solution could be further simplified by working at constant flow and eliminating the flow control valve. The only variability would then remain the temperature via the air heating means.

DETAILED DESCRIPTION

In the following description, the same references refer to identical or corresponding parts in the different figures.

Furthermore, axial refers to anything extending along or parallel to the longitudinal axis (X) of rotation of the part of the turbine engine concerned, the axis being in principle the main axis of rotation of the turbine engine. All that extends radially to the X axis and is circumferential which extends around the X axis is radial (Z axis). I All that is radially so, with respect to the X axis is internal and external, except occasionally, for the external and the internal of arm 78.

According to common sense in aeronautic engines:
HP means high pressure, and BP means low pressure,
the stator is the fixed part of the turbomachine and the rotor is the moving part (in relation to the stator).

Figure 1:
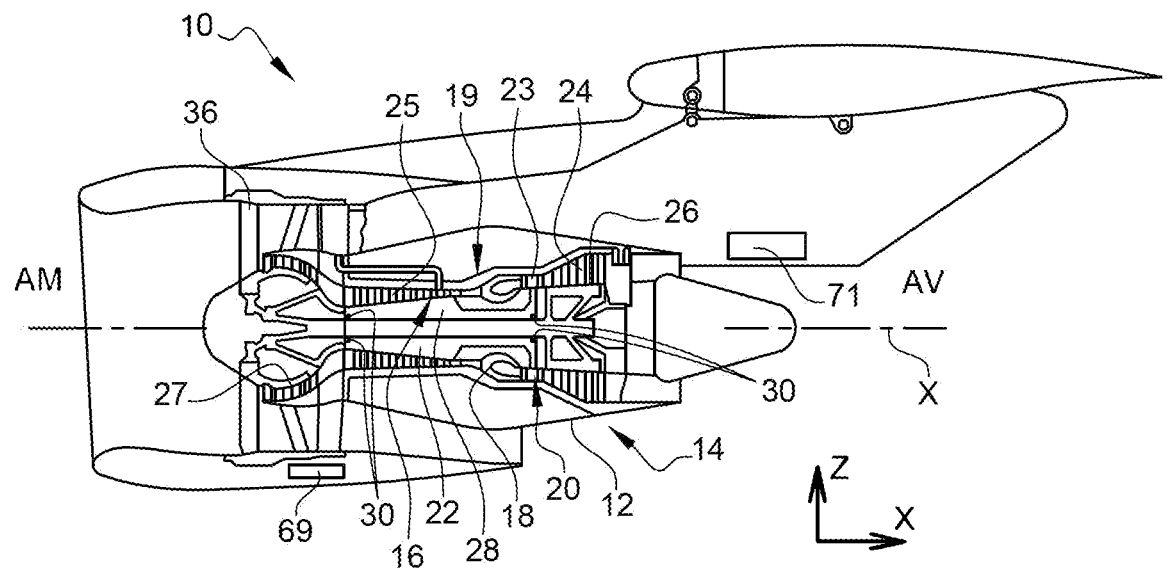
FIG. 1 shows a schematic diagram of an aircraft double flow gas turbomachine, in section in a plane containing the X-axis around which the rotor rotates.

Referring now to the drawings, and in particular to FIG. 1, a gas turbomachine, globally designated by 10, for aircraft (not shown) is illustrated. The turbomachine 10 has a said longitudinal axis X and an annular intervein casing 12, arranged coaxially and concentrically around the axis X. The turbomachine 10 comprises a gas generator 14 which is provided, axially from upstream (AM) to downstream (AV), with a compressor unit 16, an annular combustion chamber 18, and a turbine unit 20, all arranged coaxially along the longitudinal axis X.

Turbine unit 20 consists successively of:
- a high-pressure turbine 23 connected to the high-pressure compressor 25 of the compressor unit 16 by a HP drive shaft 22 (high-pressure shaft), and
- a low-pressure turbine 24.

The compressor unit 16 consists of a low pressure compressor 27 and the high pressure (HP) compressor 25.

The high pressure compressor 25 can define a double stage compressor: intermediate compressor (IP) followed by the true high pressure compressor.

The gas generator 14 generates combustion gases. Pressurized air from the HP compressor 25 is mixed with fuel in combustion chamber 18 where the mixture is ignited, thus generating combustion gases. Part of the work is extracted from these gases by the high-pressure turbine 23 which drives the HP compressor 25. The combustion gases are discharged from gas generator 14 into the low-pressure turbine 24.

The low-pressure turbine 24 comprises a rotor 26 which is fixedly attached to a BP drive shaft 28 (low-pressure shaft) rotatably mounted inside the HP drive shaft 22 via differential bearings 30. The LP shaft 28 drives the rotor of the low pressure compressor 27. Compressor 27 supports an upstream row of blades (or rotating blades) of a blower (fan) 36. Blower 36 is connected directly or indirectly to the BP drive shaft 28.

As is the case for compressors 27 and 25, in particular high-pressure turbine 23 which, in the turbine unit 20, is therefore a part of the rotor of the turbomachine, comprises rotating blades which rotate, around the X axis, inside a fixed annular casing, which is therefore a part of the stator 19 of the turbomachine.

Figure 2:
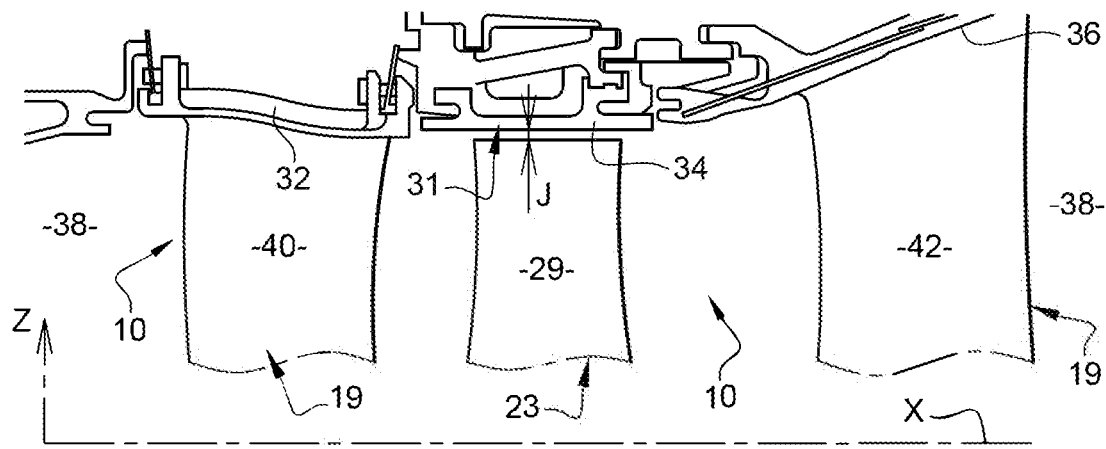
FIG. 2 shows a section in the same plane of the turbine area of the turbomachine.

In FIG. 2, one of the rotating blades of high-pressure turbine 23 is marked 29. The fixed annular casing, centered on the X axis, is marked 31. Thus, the rotating blades (rotor part) of the high-pressure turbine 23 (such as the one marked 29) rotate inside the stationary annular casing 31 (stator part). Typically, this fixed annular casing 31 may be formed from a plurality of ring segments, such as 32, 34, 36 mounted via spacers (not shown). The parts of stator 19 that face the top of the rotating blades, such as 29, will then be formed by the inner surface of the ring segments.

The wall defined by the fixed annular casing 31 externally delimits the flow path 38 of the primary air flow in which in particular the rotating blade 29 rotates, which is mounted between two rows of upstream fixed blades 40 and downstream fixed blades 42. The fixed blades 40, 42 are each carried by the (stationary) ring segments 32, 36 between which, along the X axis, the (stationary) ring segment 34 is located opposite the outer end of the moving blade 29, which, like the other moving blades of the high-pressure turbine, is carried by a rotor disc of this high-pressure turbine (not shown).

In the following, we will discuss the preferred example of a clearance control on the high-pressure turbine 23. Indeed, the performance of the turbine 23 used in the example (not limiting) is a function, at first order, of the residual radial clearance J between the tip of the rotating blades (such as blade 29) and the fixed annular casing 31 (in the example the fixed ring segment 34). However, just as such control is critical on such a turbine in view of the stresses occurring during operation, the principle of embodiments of the invention can, in general, be applied to other locations in the turbomachine, as soon as it is desired to control a radial clearance between rotating rotor blades and an annular casing (a wall) of the stator 19, which surrounds them. In any case, in all these situations, it is proposed here that said residual radial clearance J between a rotating blade tip (such as 29) and a fixed annular casing (such as 31) arranged around it is controlled, if necessary throughout the operation of the turbomachine and then following the flight phase, by controlling the temperature of the external fixed annular casing, which, by its expansion, opens more or less the radial clearance (clearance J in the example). This control is, in embodiments of the invention, carried out by means of a device 33 for controlling this clearance (J), comprising (at least) a path 35 for circulation of an air flow F between:
- (at least) an air intake 37 adapted to enable air to be taken from at least a first zone of the turbomachine, such as 39a and/or 39b in FIG. 3, and
- (at least) an air blower 41 adapted to enable air to be blown into at least a second zone 42 of the turbomachine, onto the relevant fixed annular casing (here the one marked 31), in order to change a temperature thereof.

Applied to a turbine, and in particular the high pressure turbine 23, the following is advantageously fixed:
- one or several first zones, such as 39a and/or 39b, for taking in air 37 from one or more compressor stages 27 and/or 25, and
- one or several second zones 42 for blowing out air 41 on one or more turbine stages 23 and/or 24.

However, it was noted that the current technology for checking the above-mentioned radial clearance is insufficient for opening this clearance. In particular, the hot air blowing 41 impact is insufficiently effective because the response time of the impact air temperature is high due to the inertia of the first air extraction zone(s) and the air supply nozzles connected to it. The opening of the radial clearance J may be too slow in relation to the displacement of the fixed annular casing 31, typically during acceleration of the turbomachine. It may then no longer be possible to effectively protect against wear and tear caused by friction.

Figure 3:
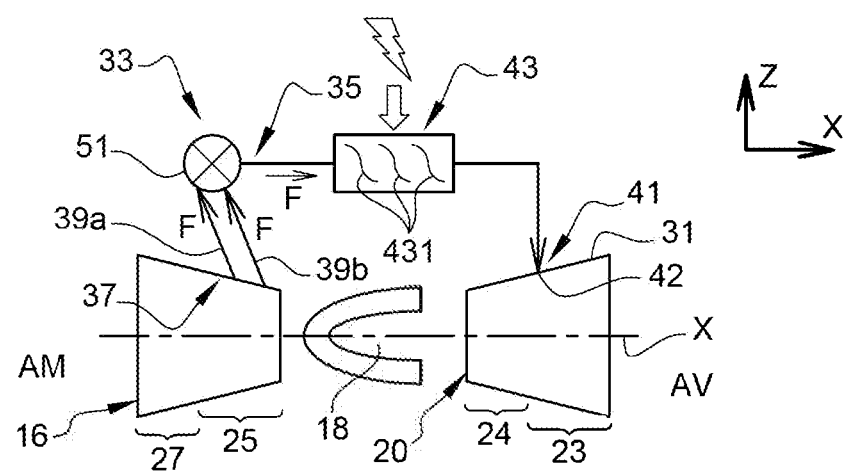
FIG. 3 represents a diagram of a possible clearance control device according to the an embodiment of the invention using possible means of heating air from an air intake on the turbomachine.

Embodiments of the invention therefore propose that the control device 33 also includes air heating means 43 (electrical resistors hereafter) adapted to act on the air circulating on said air flow path 35, in order to be able to heat it, as shown in FIG. 3.

In particular, to take into account a trade-off between thermal efficiency/available energy/efficiency/reliability, it is proposed that the air heating means 43 should include means of convection heating 430.

And it is also proposed that these air heating means 43 are, on the air flow path 35, placed directly in the taken in air flow F. Thus interposed, means 43 will be in contact with said air F circulating in the duct(s) or volume(s) 44 of the circulation path 35 of the air flow taken in.

In addition, in order to have air heating means 43 that can be easily activated on demand, without the need for complex means, and that can be "immersed" in the air flow taken in, whether or not to heat it, the use of electrical resistors 431 as air heating means 43 will be appropriate. For both fine and powerful adjustment, the use of electrical resistors 431 connected electrically in parallel (see FIG. 4), following one or more networks, some networks may be in series (see dotted line in FIG. 4 which shows a possibility or alternative of electrical resistors 431a; 431b in series, at the location of all or part of said parallel electrical connections; all or part of the electrical resistors 431a; 431b in series, at the location of all or part of said parallel electrical connections; all or part of resistors 431 would then be replaced by several resistors, such as 431a; 431b, in series). Thus, the thermal exchanges between the air flow F taken in and these electrical resistors 431 can be both successive and simultaneous. It should also be noted that with electrical resistors 431 electrically connected in parallel, redundancy can be obtained in the event of failure of one or more of these resistors.

In order to promote again in particular the efficiency, the fineness of the controls/adjustments, and even the control of the energy available in the turbomachine, the control device 33 will be used favourably:

- sensor(s) 45 adapted to record physical parameters in the turbomachine and/or in its environment, such as the temperature in the external environment of the turbomachine 10 and/or the altitude at which it is located at the time the data is recorded, and
- control means 47 connected with the air heating means 43 in order to control said heating as a function of the physical parameters recorded by the sensors.

Figure 4:
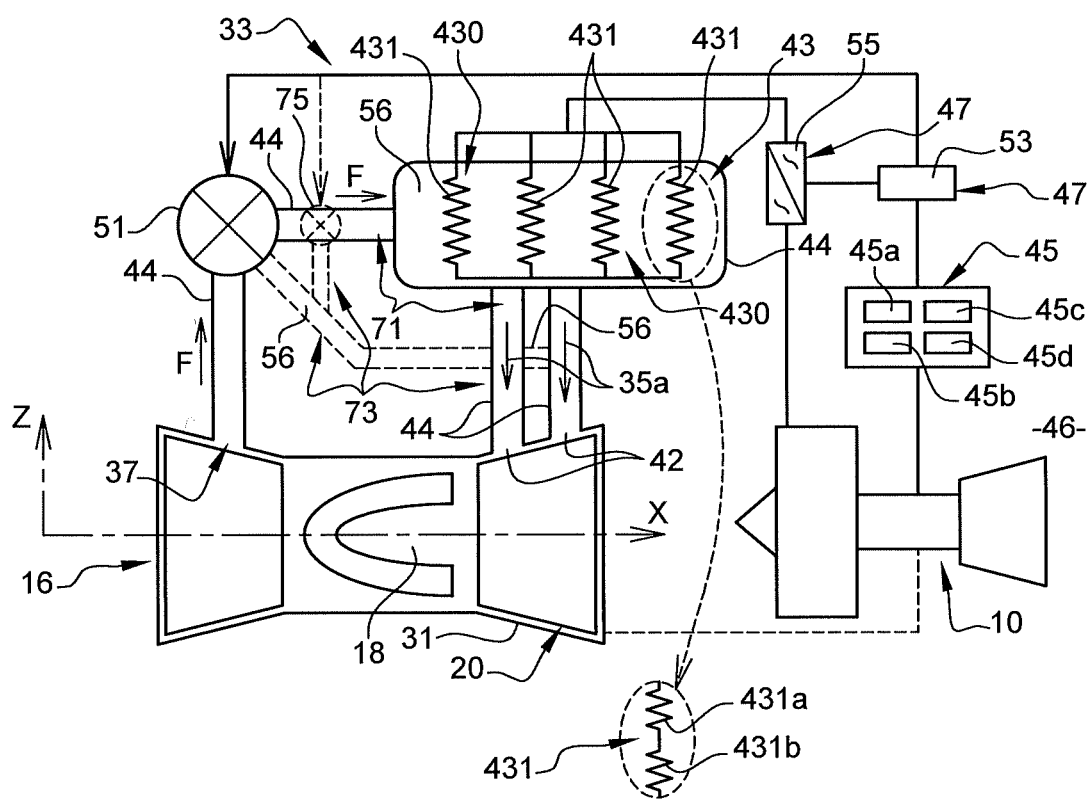
FIG. 4 represents the solution of FIG. 3 in more detail.

As shown in FIG. 4, one or more of the following sensors may be used, in particular: turbomachine speed (rotation) sensor 45a, temperature sensor 45b, pressure sensor 45c, altitude sensor 45d, during the flight of the turbomachine.

The pressure sensor 45c and temperature sensor 45b will be able to detect these pressures and temperatures on the compressor unit 16 and turbine unit 20. Advantageously, these conditions will be available both at the first air extraction zone(s) 39a and/or 39b of air intake 37 and at the second air blowing zone(s) 42 of air blowing 41.

In simplified terms, it can be considered that the sensors 45 of the physical parameters under consideration will communicate with the FADEC 53 (Full Authority Digital Engine Control, which is the system that interfaces between the cockpit of the aircraft and the turbomachine). As parameters coming from sensors 45, 45a, etc., this FADEC 53 will therefore be able in particular to receive parameters linked to different temperatures, pressures, flow rates, internal turbomachine speeds and aircraft parameters: speed (Mach), altitude, weight on wheels, ambient temperature.

As part of the control means 47, the FADEC 53 will be able to pilot a graduator 55 connected with the air heating means 43, to adjust its power (particularly in the case of electrical resistors 431).

An advantage of the proposed solution will possibly also lie in the ability to control at the same time:

- the heating level of the air taken in (modulation of the heating of this air by said air heating means 43), and
- the air flow rate, via at least one valve 51 which will preferably not be "all or nothing", but with a variable flow rate.

Consequently, the following is proposed:

- that said clearance control device 33 further comprises a regulating valve 51 interposed in the flow path 35 of an air flow F to allow more or less air to circulate in the air flow path, or
- that the aforementioned control means 47 are further connected with said regulating valve 51, to control the air flow to the second blowing air zone(s) 42 according to the physical parameters recorded by the sensors 45.

With a flow adjustable mixer valve 51, it is advantageous to have the FADEC 53 control it, in addition to the graduator 55.

On air flow path 35 of air flow F, valve 51 will be located downstream of the first zone(s) 39a and/or 39b of air intake 37 and upstream:

- both the air heating means 43 (in particular in the case of electrical resistors 431), and
- the second air blowing zone(s) 42 on the fixed annular casing 31.

Thus, depending on the phases of flight of the aircraft, and therefore of the turbomachine, the logic included in the FADEC 53 will distribute either "cold" air (unheated air downstream of intake 41), or air heated by air heating means 43.

On this subject, it would be useful to provide that valve 51 is a three-way valve allowing, typically under the control of the control means 47, to direct the air coming from the air intake 37:

- to the air heating means 43, and/or
- via a bypass duct 56, directly to a downstream part 35a of the air flow path 35 of the air flow F located downstream of the air heating means 43, between (the volume 58 which encloses) said air heating means 43 and the second air blowing zone(s) 42.

For example, with a proportional valve 51 it will be possible to ensure a proportional distribution of the intake air between the air to be directed to the bypass duct 56 and the air to be directed to the air heating means 43.

Thus, in certain flight and/or ground situations (e.g. in flight at medium altitude or when an aircraft is taxiing on the ground), the air taken in may not be allowed to come into contact with the air heating means 43.

It can therefore be considered that the control device 33 will then be such that the flow path of air flow 35 includes:

- a first circuit 71 on which said air heating means 43 (electric resistors) will be adapted to act on the air F which circulates therein to enable it to be heated (as explained above), and
- a bypass circuit 73 which will enable to bypass these air heating means 43. Thus, the air taken from the air intake 37 can be distributed to the air blowing zone 41 without coming into contact with the heating means 43, whether or not they are operating.

To direct (all or part of) the air drawn off to the first circuit 71 or to the bypass circuit 73, valve 51 may be used, which will then be a three-way valve, or, as an alternative or complement, a bypass valve 75 (which may also be a three-way valve, of the all or nothing or dosing/control type) may be interposed on path 35, upstream of the heating means 43; see FIG. 0.4 where the dotted lines mark, in the area concerned, the possible bypass assumptions.

With a combination between the air heating means 43 and the valve 51, it will be possible to cool or heat the casing 31 and to close more or less the radial clearance J according to the flow quantity (flow F) and the mixing ratio between the different intakes (or even between the different ducts, as with the bypass duct 56), if several first zones, such as 39a, 39b, successively along the X axis exist, as symbolized in FIG. 3. These two parameters can be managed via valve 51, which will allow more or less air to pass through, in the compressor for the example used, and which will modulate the mixture between the sources (zones 39a, 39b). The air intake zones 39 may be located respectively towards the axial middle of the HP compressor 25 and towards the downstream axial end of this HP compressor 25.

However, it may be preferable for this air intake to take place at only one of the stages of the HP compressor 25, such as towards the middle axial stage of this compressor, thus simplifying the intake and the pressures to be taken into account.

Figure 5:
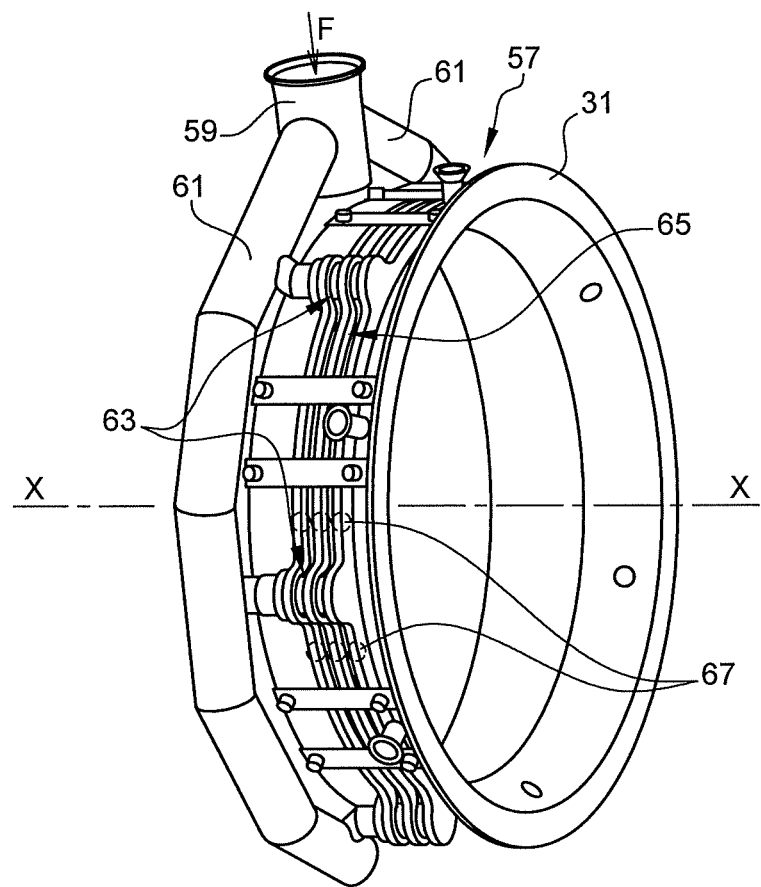
FIG. 5 represents a possible construction of a part of the turbomachine surrounding the air blowing area to blow air onto a fixed annular casing of this turbomachine.

Downstream of the air heating means 43, the clearance control device 33 may also comprise, in order to distribute the air F efficiently and at the desired temperature, a circular control box 57 adapted to surround said annular casing 31; see FIG. 5.

In this context, air heating means 43 can be arranged:

- either in front of this circular control box 57, or
- in this control box 57.

The compactness of the electrical resistors 431 solution means that they can be placed directly in the box 57.

In fact, for thermal efficiency and therefore good air distribution around the casing 31, the control box 57 can be designed to include successively, on the flow path 35 of an air flow, from upstream to downstream:
- at least one air supply tube 59,
- air collector tubes 61, in the form of a ring or a portion of a ring,
- at least one air duct 63,
- at least one air circulation ramp 65 arranged circumferentially around the annular casing 31 and pierced with orifices 67 defining the air blowing 41 at the location of said second zone 42 of the turbomachine.

The air supply tube 59 will receive the air in said downstream part 35a of path 35 of airflow path F.

Air supply tube 59 therefore communicates with air intake 37 to supply air to the air collector tubes 61. These air collector tubes 61 then supply air to the air duct(s) 63 which opens into the air flow ramp(s) 65 pierced with air blowing orifices 67 on the casing 31, at the location of said second zone 42 of the turbomachine. Only a few orifices 67 are shown in FIG. 5.

Placed end to end (see FIG. 5), the air collector tubes 61 can extend in the form of a ring or a portion of a ring.

The air heating means 43 are located upstream of the air supply tube(s) 59. They could also be placed in this (these) air supply tube(s) 59, although this situation is more difficult to manage than the previous one as it is subject to more pressure drops and is more cramped.

As shown in FIG. 5, the control device may comprise three axially successive air flow ramps (X-axis). These ramps can be mounted circumferentially around the outer surface of casing 31 thanks to fastening means. A single air circulation ramp could be considered.

The air circulation ramps 65 are axially spaced from each other and are approximately parallel to each other.

The ramps 65 are therefore provided with a plurality of air blowing orifices 67, arranged opposite the outer surface of casing 31 and the vanes, thus allowing air at the desired temperature to discharge onto casing 31 in order to change its temperature very effectively.

The one or more ramps 65 may be segmented into several separate ramp angle sectors evenly distributed around the circumference of the casing 31.

Concerning the supply of electrical energy to the device, and therefore the air heating means 43, two solutions can be considered, in particular:
- an electrical power draw from the alternator 69 with which the turbomachine is equipped (FIG. 1),
- an electrical power draw from batteries and/or capacitors 71 which would be charged beforehand on the aircraft.

The phases of flight where reheating is required should be relatively short, less than 30 minutes.

The invention claimed is:

1. A clearance control device for controlling clearance between tips of blades of a rotor of an aircraft turbomachine and an annular casing of a stator of the aircraft turbomachine, said clearance control device comprising a flow path for a flow of air between:
   - an air intake adapted to enable air to be taken from a first zone of the aircraft turbomachine,
   - an air blower adapted to enable air to be blown to said annular casing, at the location of a second zone of the aircraft turbomachine, in order to modify a temperature of said annular casing, and
   - air heating means adapted to interfere with air circulating in said air flow path, to enable said air to be heated,
   wherein the air heating means comprise electrical resistors which are electrically connected in parallel and are arranged successively in said air flow path, one after the other.

2. The clearance control device according to claim 1, in which the electrical resistors are interposed in the flow path, in the airflow.

3. The clearance control device according to claim 1, further including:
   - a sensor adapted to sense at least one physical parameter in the aircraft turbomachine and/or in an environment of the aircraft turbomachine, and
   - control means connected with the air heating means in order to control heating of air as a function of the at least one physical parameter sensed by the sensor.

4. The clearance control device according to claim 1, which further comprises a regulating valve interposed in the airflow path, to allow more or less air to flow in the airflow path.

5. The clearance control device according to claim 3:
   which further comprises a regulating valve interposed in the airflow path, to allow more or less air to flow in the airflow path, and
   wherein the control means are further connected with said regulating valve, for controlling the airflow to the air blower in accordance with the physical parameter sensed by the sensor.

6. The clearance control device according to claim 1, wherein the airflow path comprises:
   - a first circuit in which said electrical resistors are adapted to interfere with air circulating in said first circuit, and
   - a bypass circuit which bypasses said air heating means.

7. An aircraft turbomachine comprising:
   a clearance control device for controlling clearance between tips of blades of a rotor of an aircraft turbomachine and an annular casing of a stator of the aircraft turbomachine, said clearance control device comprising a flow path for a flow of air between:
   - an air intake adapted to enable air to be taken from a first zone of the aircraft turbomachine,
   - an air blower adapted to enable air to be blown to said annular casing, at the location of a second zone of the aircraft turbomachine, in order to modify a temperature of said annular casing, and
   - air heating means adapted to interfere with air circulating in said air flow path, to enable said air to be heated,
   wherein:
   the clearance control device further comprises a control box mounted on said annular casing, and
   the air heating means are arranged upstream of the control box with respect to a direction of flow of the airflow from the air intake to the air blower and/or are arranged in the control box.

8. The aircraft turbomachine according to claim 7, further comprising:
   - a compressor unit comprising said first zone of the aircraft turbomachine where said air intake is located,
   - a turbine unit comprising said annular casing and said rotor blades which drive other rotor blades of the compressor unit in, rotation, via a shaft,
   wherein the control box comprises successively, in the flow path of the airflow:
   - at least one air supply tube for supplying air to air collecting tubes, said at least one air supply tube communicating with said air intake, said air collecting tubes which have a ring shape or a portion of ring shape, for supplying air to air ducts opening into at least one annular air flow ramp arranged circumferentially around the annular casing, said at least one annular air flow ramp having orifices defining said airflow at the location of said second zone of the aircraft turbomachine, said air ducts, said at least one annular air circulation ramp, and wherein the air heating means are arranged upstream of said at least one air supply tube or in said at least one air supply tube.

9. A clearance control device for controlling clearance between tips of blades of a rotor of an aircraft turbomachine and an annular casing of a stator of the aircraft turbomachine, the clearance control device comprising a flow path for a flow of air between:

an air intake adapted to enable air to be taken from a first zone of the aircraft turbomachine, an air blower adapted to enable air to be blown to said annular casing, at the location of a second zone of the aircraft turbomachine, in order to modify a temperature of said annular casing, and air heating means adapted to interfere with air circulating in said air flow path, to enable said air to be heated, the clearance control device further comprising an air regulating system which comprises at least one of a valve disposed on the airflow path and a bypass circuit branched on the airflow path, the bypass circuit being adapted to bypass said air heating means, so that a variable quantity of air is allowed to flow in the airflow path.

* * * * *